(12) United States Patent
Maekawa

(10) Patent No.: US 11,906,615 B2
(45) Date of Patent: Feb. 20, 2024

(54) OBJECT POSITION DETECTION SYSTEM

(71) Applicant: Murata Manufacturing Co., Ltd., Kyoto (JP)

(72) Inventor: Takuya Maekawa, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 603 days.

(21) Appl. No.: 17/091,087

(22) Filed: Nov. 6, 2020

(65) Prior Publication Data

US 2021/0055403 A1 Feb. 25, 2021

Related U.S. Application Data

(63) Continuation of application No. PCT/JP2019/017316, filed on Apr. 23, 2019.

(30) Foreign Application Priority Data

May 10, 2018 (JP) .................................. 2018-091557

(51) Int. Cl.
*G01S 13/42* (2006.01)
(52) U.S. Cl.
CPC .................................... *G01S 13/42* (2013.01)
(58) Field of Classification Search
None
See application file for complete search history.

(56) References Cited

U.S. PATENT DOCUMENTS

| 2007/0176822 | A1  | 8/2007  | Shirakawa |            |
|--------------|-----|---------|-----------|------------|
| 2009/0040094 | A1  | 2/2009  | Harada et al. |        |
| 2010/0033365 | A1* | 2/2010  | Kishida   | G01S 13/42 |
|              |     |         |           | 342/146    |
| 2012/0268314 | A1* | 10/2012 | Kuwahara  | G01S 13/42 |
|              |     |         |           | 342/147    |

(Continued)

FOREIGN PATENT DOCUMENTS

| JP | H05-256941 A | 10/1993 |
| JP | 2005-254869 A | 9/2005 |

(Continued)

OTHER PUBLICATIONS

International Search Report for PCT/JP2019/017316 dated Jul. 16, 2019.
Written Opinion for for PCT/JP2019/017316 dated Jul. 16, 2019.

*Primary Examiner* — Whitney Moore
(74) *Attorney, Agent, or Firm* — Pearne & Gordon LLP

(57) ABSTRACT

To provide an object position detection system in which positions of detection target objects are determined with accuracy, in which pairing accuracy increases, and in which accuracy of detecting the detection target objects increases. Radar devices 2A and 2B receive, with respective reception antennas 31, reception waves obtained by transmission waves that have been transmitted from respective transmission antennas 25 being reflected back from a plurality of targets T1, T2, T3, T4, . . . , and Tm and calculate relative distances to the plurality of targets T1, T2, T3, T4, . . . , and Tm from beat frequencies between the transmission waves and the reception waves without using pieces of phase information of the transmission waves and the reception waves. An arithmetic device 4 includes a pairing means and a position calculation means.

7 Claims, 4 Drawing Sheets

(56) References Cited

U.S. PATENT DOCUMENTS

2016/0377713 A1* 12/2016 Kamo .................. G01S 7/35
                                                                           342/157
2017/0205507 A1   7/2017  Liu et al.
2018/0088230 A1   3/2018  Hung et al.

FOREIGN PATENT DOCUMENTS

| JP | 2007-232594 A | 9/2007 |
| --- | --- | --- |
| JP | 2010-203918 A | 9/2010 |
| JP | 2013-238616 A | 11/2013 |
| JP | 2017-125802 A | 7/2017 |

* cited by examiner

OBJECT POSITION DETECTION SYSTEM

This is a continuation of International Application No. PCT/JP2019/017316 filed on Apr. 23, 2019 which claims priority from Japanese Patent Application No. 2018-091557 filed on May 10, 2018. The contents of these applications are incorporated herein by reference in their entireties.

BACKGROUND OF THE DISCLOSURE

Field of the Disclosure

The present disclosure relates to an object position detection system that detects positions of a plurality of detection target objects by using a plurality of radar devices.

Description of the Related Art

In the related art, as this type of apparatus, there is an obstacle detection apparatus disclosed in Patent Document 1, for example. This obstacle detection apparatus detects an obstacle on a railroad track at a railroad crossing by using two radar devices that are a first radar device and a second radar device. In other words, the obstacle detection apparatus calculates a two-dimensional position of a reflecting object from a distance to the reflecting object detected by the first radar device, a distance to the reflecting object detected by the second radar device, and a distance between the first and second radar devices, and detects, as an obstacle, the reflecting object within a predetermined area. In this obstacle detection apparatus, no radio wave has to be scanned, and real-time object detection is possible.

Furthermore, in the related art, as this type of apparatus, there is also a target detection system disclosed in Patent Document 2. In a target detection device in this target detection system, a switch means connects, in a time-sharing manner, a plurality of sensor means to a transmission-reception means that performs signal processing, and the single transmission-reception means is thus shared by the plurality of sensor means. First and second target detection devices transmit respective first and second transmission signals toward respective different angular ranges and receive signals reflected from a target with a plurality of sensor means. Subsequently, from reception signals, the first distance information and the second distance information of the target are extracted. A processing means calculates a position of the target from the first distance information and the second distance information by using a triangulation method. If there is a plurality of targets, a calculation is made in consideration of a detection region of each sensor means, and information on the total propagation distance from one target detection device to the other target detection device through each target is used, thereby keeping false detection from occurring.

Patent Document 1: Japanese Unexamined Patent Application Publication No. 2005-254869

Patent Document 2: Japanese Unexamined Patent Application Publication No. 2013-238616

BRIEF SUMMARY OF THE DISCLOSURE

However, the above-described existing obstacle detection apparatus disclosed in Patent Document 1 calculates a two-dimensional position of a detection target object only by using pieces of distance information detected by the first and second radar devices. For this reason, when there are a plurality of detection target objects, a mistake occurs in pairing in which a combination of pieces of distance information of the same detection target object is specified, and false detection of a detection target object occurs.

Furthermore, in the above-described existing target detection system disclosed in Patent Document 2, to extract the first and second distance information on distances to a target, pieces of phase information of reception signals and transmission signals are used. Phase information is affected by a medium through which a transmission wave and a reception wave propagate and is likely to vary. Furthermore, as an elevation angle of the target with respect to a radar signal transmitted from each target detection device becomes low, an error included in an estimated relative angle of the target with respect to the target detection device becomes large. For this reason, the accuracy of position information of the detected target worsens.

The present disclosure has been made to solve such issues and provides an object position detection system includes a plurality of radar devices configured to receive, with respective reception antennas, reception waves obtained by transmission waves that have been transmitted from respective transmission antennas being reflected back from a plurality of detection target objects and configured to calculate relative distances to the plurality of detection target objects without using pieces of phase information of the transmission waves and the reception waves; and an arithmetic device including a pairing means configured to perform, by using a plurality of different methods, pairing in which, of the relative distances to the plurality of detection target objects calculated by the individual radar devices, a combination of relative distances for a same detection target object is specified, and a position calculation means configured to calculate a position of each detection target object in accordance with relative distances paired by the pairing means.

In this configuration, the arithmetic device calculates the position of each detection target object only by using relative distances from the individual radar devices to the detection target object without using pieces of phase information of transmission waves and reception waves. For this reason, the position of each detection target object is determined with accuracy without varying under the influence of a medium through which transmission waves and reception waves propagate. Furthermore, even if a detection target object is at a low elevation angle, errors in relative distances calculated and estimated by the radar devices do not depend on relative angles of the detection target object with respect to the radar devices and thus can be detected with accuracy. Furthermore, the arithmetic device determines relative angles of a detection target object without using phase difference information between the reception antennas, and the maximum detectable number of detection target objects is thus not limited by the number of antennas. Furthermore, a plurality of transmission waves enter a detection target object from the plurality of radar devices, and incident angles of those transmission waves differ according to the radar devices. Thus, intensities of reception waves reflected from the detection target object and received also differ according to the radar devices. For this reason, when a relative distance to a detection target object calculated in a radar device that receives a reception wave of high signal intensity is referred to, in a radar device as well that receives a reception wave of low signal intensity, a reception wave corresponding to the calculated relative distance can be found. This increases the probability of detection of a detection target object in each radar device. Furthermore, the pairing means in the arithmetic device performs, by using a plurality of different methods, pairing in which a combination of relative distances for the same detection target object is specified, and thus pairing accuracy increases. As a result, in the overall object position detection system, the accuracy of detecting a detection target object increases.

The present disclosure can provide the object position detection system in which the position of each detection target object is determined with accuracy, in which pairing accuracy increases, and in which the accuracy of detecting the detection target object increases.

DETAILED DESCRIPTION OF THE DISCLOSURE

Next, an embodiment for implementing an object position detection system according to the present disclosure will be described.

Figure 1:
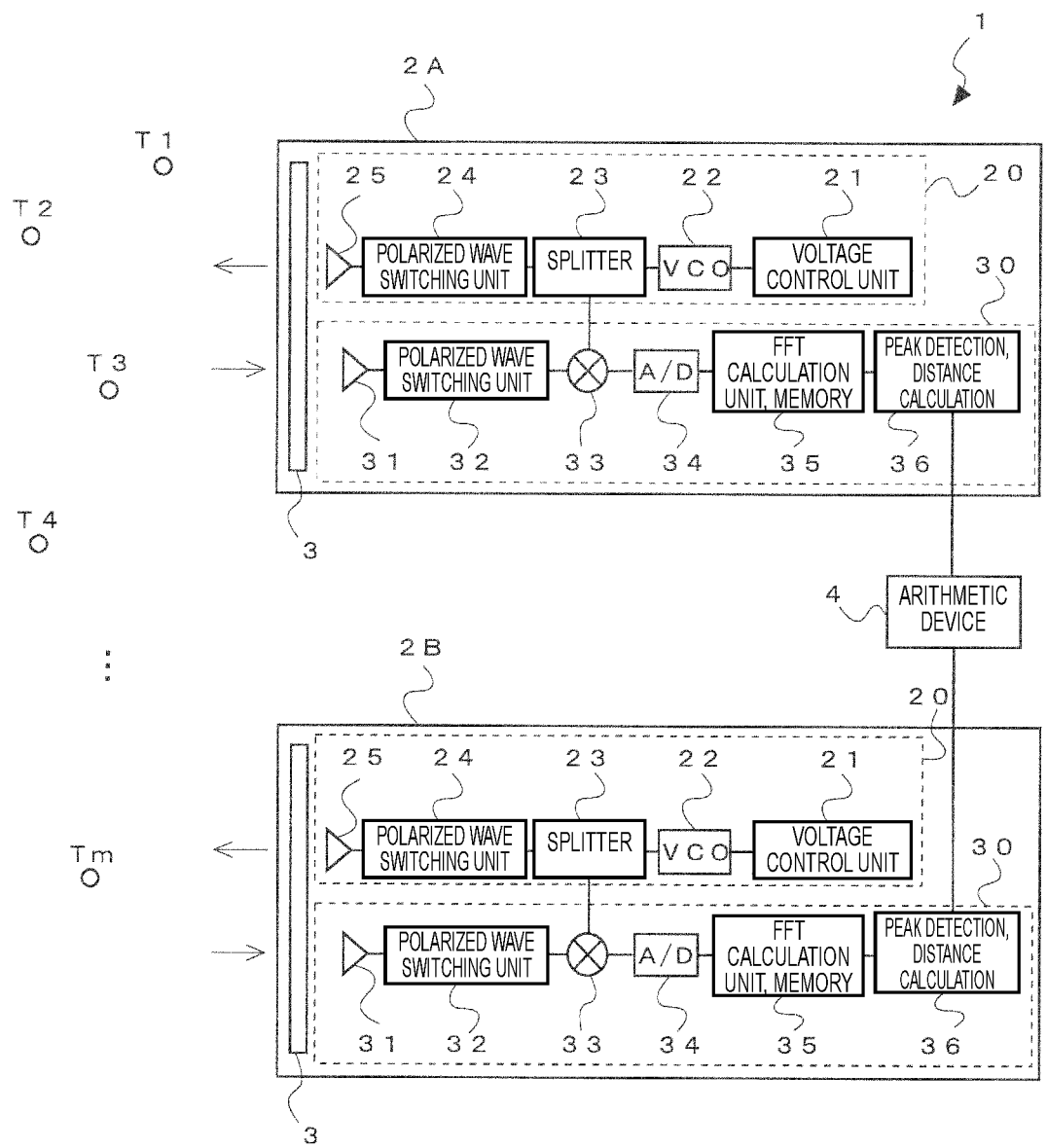
FIG. 1 is a block configuration diagram of an object position detection system according to one embodiment of the present disclosure.

FIG. 1 is a block configuration diagram of an object position detection system 1 according to one embodiment of the present disclosure.

The object position detection system 1 is constituted by a plurality of radar devices 2A and 2B, and an arithmetic device 4. A plurality of targets T1, T2, T3, T4, . . . , and Tm serve as detection target objects.

Each of the radar devices 2A and 2B is an FMCW (Frequency Modulated Continuous Wave) radar constituted by a transmission unit 20 and a reception unit 30 and has the same configuration. The transmission unit 20 includes a voltage control unit 21, a VCO (Voltage-controlled oscillator) 22, a splitter 23, a polarized wave switching unit 24, and a horizontally and vertically polarized waves transmission antenna 25. When a voltage applied to the VCO 22 is controlled by the voltage control unit 21, the VCO 22 oscillates to generate a frequency-modulated high-frequency signal in a GHz band. This high-frequency signal is outputted to the polarized wave switching unit 24 via the splitter 23. The polarized wave switching unit 24 switches between a horizontally polarized wave component and a vertically polarized wave component of the inputted high-frequency signal in a time-sharing manner and outputs the horizontally polarized wave component and the vertically polarized wave component to the horizontally and vertically polarized waves transmission antenna 25. Thus, an electromagnetic wave having a horizontally polarized wave component and an electromagnetic wave having a vertically polarized wave component that have been subjected to frequency modulation are alternately transmitted at certain intervals of time from the horizontally and vertically polarized waves transmission antenna 25. The transmission unit 20 transmits, as a continuous wave, a horizontally polarized wave component and a vertically polarized wave component of an electromagnetic wave that has been subjected to frequency modulation to have a different frequency depending on the radar devices 2A and 2B so that interference between the radar devices 2A and 2B does not occur.

An electromagnetic wave transmitted from the horizontally and vertically polarized waves transmission antenna 25 is applied to the targets T1, T2, T3, T4, . . . , and Tm. After application of the electromagnetic wave to the targets T1, T2, T3, T4, . . . , and Tm, electromagnetic waves reflected from the targets T1, T2, T3, T4, . . . , and Tm are received by the reception unit 30.

The reception unit 30 includes a horizontally and vertically polarized waves reception antenna 31, a polarized wave switching unit 32, a mixer 33, an A/D converter 34, an FFT calculation unit and calculation result storage memory 35, and a peak detection and distance calculation unit 36. Furthermore, a radome 3 that protects the transmission antenna 25 and the reception antenna 31 is provided in front of the transmission antenna 25 and the reception antenna 31. The FFT calculation unit and calculation result storage memory 35 and the peak detection and distance calculation unit 36 are constituted by hardware of an electronic circuit, software based on a program of a microprocessor, or a combination of the hardware and the software.

The horizontally and vertically polarized waves reception antenna 31 receives, for each frequency, a horizontally polarized wave component and a vertically polarized wave component of each of the reflected waves reflected back from the targets T1, T2, T3, T4, . . . , and Tm after the transmission performed by the transmission unit 20. The polarized wave switching unit 32 switches, in a time-sharing manner, between horizontally polarized wave components and vertically polarized wave components of electromagnetic waves received by the horizontally and vertically polarized waves reception antenna 31 and inputs a horizontally polarized wave component and a vertically polarized wave component to the reception unit 30 for each frequency. Subsequently, a horizontally polarized wave component and a vertically polarized wave component of each of the electromagnetic waves received by the horizontally and vertically polarized waves reception antenna 31 are alternately outputted at certain intervals of time to the mixer 33.

An oscillator output supplied by the VCO 22 of the transmission unit 20 is given to the mixer 33 by the splitter 23. The mixer 33 mixes the oscillator output given from the splitter 23 with high-frequency signals in the GHz band received by the horizontally and vertically polarized waves reception antenna 31 to reduce the received high-frequency signals in the GHz band to intermediate-frequency signal (IF signal) levels in a MHz band and outputs an IF signal to the A/D converter 34 for each frequency of the reflected waves. The A/D converter 34 converts the IF signal output from the mixer 33 from an analog signal to a digital signal and outputs the IF signal to the FFT calculation unit and calculation result storage memory 35. The FFT calculation unit and calculation result storage memory 35 performs, for each frequency of the reflected waves, a fast Fourier transform on an IF signal that has been converted to a digital signal to convert a temporal signal to a frequency signal. Subsequently, for each frequency of the reflected waves, an IF signal having a horizontally polarized wave component of a reflected wave to which switching has been performed by the polarized wave switching unit 32 is temporarily stored, as main data, in a memory of the FFT calculation unit and calculation result storage memory 35, and an IF signal having a vertically polarized wave component of the reflected wave to which switching has been performed by the polarized wave switching unit 32 is temporarily stored, as auxiliary data, in the same memory.

The peak detection and distance calculation unit 36 reads out, for each frequency of the reflected waves, a horizontally polarized wave component and a vertically polarized wave component of a reflected wave temporarily stored in the FFT calculation unit and calculation result storage memory 35, and compares, for each frequency of the reflected waves, intensities of a horizontally polarized wave component and a vertically polarized wave component of each of the reflected waves received by the reception unit 30. Then, for each of horizontally polarized wave components and vertically polarized wave components of the reflected waves, a plurality of frequencies at which an intensity peak appears are detected. Subsequently, from frequency differences (beat frequencies) between a transmission wave and reception waves for detected frequencies, relative distances to the targets T1, T2, T3, T4, . . . , and Tm are calculated, and calculation results thereof are transmitted to the arithmetic device 4.

In other words, the radar devices 2A and 2B receive, with the respective reception antennas 31, reception waves obtained by transmission waves that have been transmitted from the respective transmission antennas 25 being reflected back from the plurality of targets T1, T2, T3, T4, . . . , and Tm, and calculate relative distance to the plurality of targets T1, T2, T3, T4, . . . , and Tm without using pieces of phase information of the transmission waves and the reception waves.

The arithmetic device 4 is constituted by software based on a program of a microprocessor, hardware of an electronic circuit, or a combination of the hardware and the software and includes a pairing means and a position calculation means. The pairing means performs pairing by using a plurality of different methods. Pairing herein is to specify, of relative distances to the plurality of targets T1, T2, T3, T4, . . . , and Tm calculated by the radar devices 2A and 2B, a combination of relative distances for the same target. In the present embodiment, the pairing means uses both a pairing method in which a combination of relative distances for the same target is specified in accordance with reception power of each of reception waves received from the targets T1, T2, T3, T4, . . . , and Tm and relative distances to the targets T1, T2, T3, T4, . . . , and Tm and a pairing method in which a combination of relative distances for the same target is specified in accordance with horizontally polarized wave components and vertically polarized wave components of the reception waves.

The former pairing method based on reception power and each relative distance is based on the following principle.

As indicated by a relational expression of the following expression (1), $Pr.R^4$ that is the product of reception power Pr of a reception wave received by the reception antenna 31 from the same target and the fourth power of a relative distance R to the same target is fixed. Here, Pt is transmission power of the transmission antenna 25, Gt is an antenna gain of the transmission antenna 25, Gr is an antenna gain of the reception antenna 31, σt is an effective radar reflection cross-sectional area of a target, and λ is a wave length of a transmission wave.

$$Pr.R^4 = Pt.Gt.Gr.\sigma t.\lambda^2/(4\pi)^3 \quad (1)$$

The above-described expression (1) is derived from a radar equation represented by the following expression (2).

$$Pr = Pt.Gt.Gr.\sigma t.\lambda^2/(4\pi)^3.R^4 \quad (2)$$

In the expression (1), only a value of the effective radar reflection cross-sectional area σt changes according to the targets T1, T2, T3, T4, . . . , and Tm. Thus, pairing can be performed by combining, of relative distances to the plurality of targets T1, T2, T3, T4, . . . , and Tm calculated by the radar devices 2A and 2B, relative distances for which values of products of $Pr.R^4$ are equal or close to each other.

The latter pairing method based on horizontally polarized wave components and vertically polarized wave components of reception waves is based on the following principle.

Figure 2:
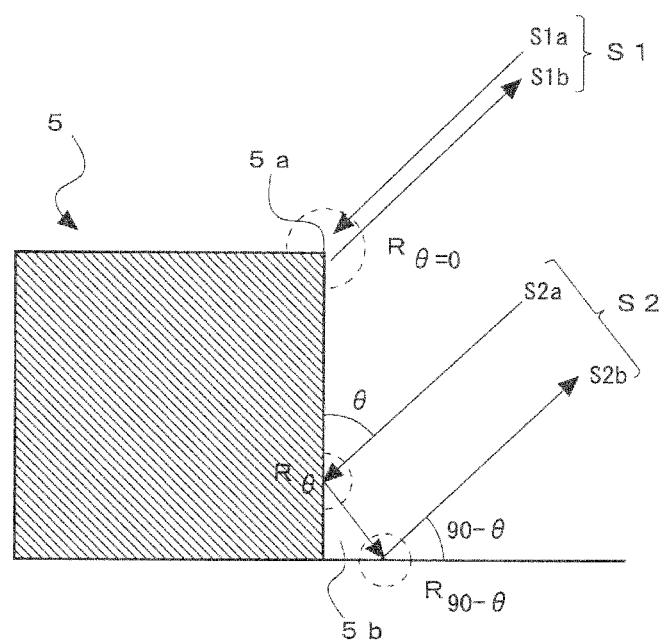
FIG. 2 illustrates a reflection mode in which a radio wave strikes and reflects from an object with a projection and a depression.

When a radio wave comes to an object 5 illustrated in FIG. 2 and a radio wave S1a enters a projection 5a of the object 5, a reflected wave S1b thereof bounces off one portion surrounded by the dashed line one time as illustrated in FIG. 2 and reflects in a direction from which the radio wave comes. Furthermore, when a radio wave S2a enters a depression 5b of the object 5, a reflected wave S2b thereof bounces off two portions surrounded by the dashed lines two times as illustrated in FIG. 2 and reflects in a direction from which the radio wave comes. Here, as illustrated in FIG. 2, assuming that incident angles of the radio waves S1a and S2a that enter the object 5 are θ [deg], a reflectance R of a radio wave S1 that enters the projection 5a and bounces one time is represented by Re corresponding to the incident angle θ. Furthermore, a reflectance R of a radio wave S2 that enters the depression 5b and bounces two times is represented by $R_\theta.R_{90-\theta}$ corresponding to the incident angle θ in accordance with a multiplication of a reflectance $R_\theta$ at the first bounce and a reflectance $R_{90-\theta}$) at the second bounce.

Figure 3A:
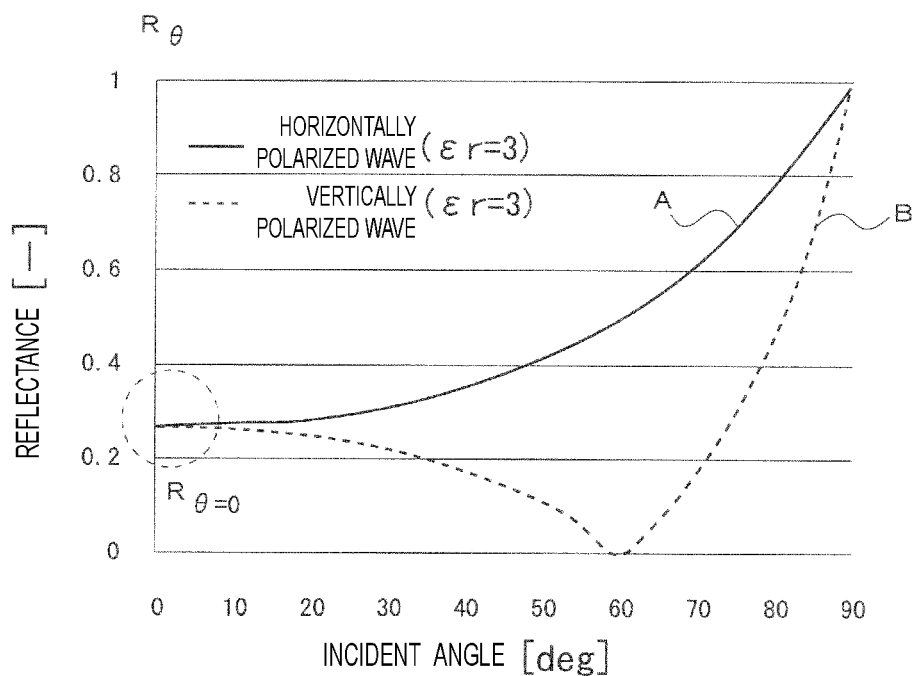
FIG. 3A is a graph illustrating reflectances corresponding to an incident angle of a horizontally polarized wave component and a vertically polarized wave component in a mode in which a radio wave strikes and reflects from a projection of an object.
Figure 3B:
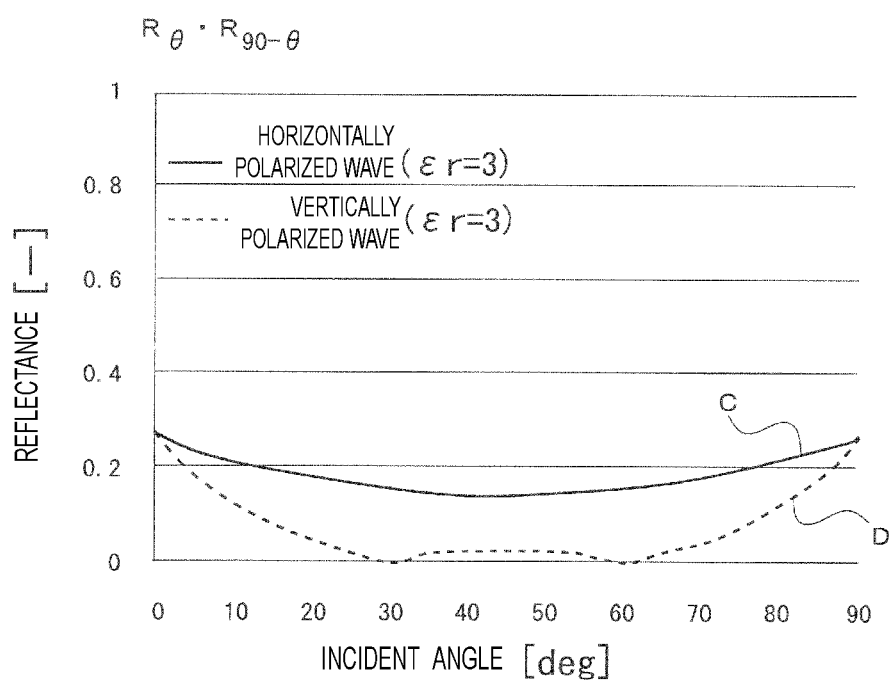
FIG. 3B is a graph illustrating reflectances corresponding to an incident angle of a horizontally polarized wave component and a vertically polarized wave component in a mode in which a radio wave strikes and reflects from a depression of the object.

A graph of FIG. 3A illustrates reflection characteristics of the radio wave S1 that reflects from the projection 5a, a characteristic line A indicated by the solid line represents a reflection characteristic of a horizontally polarized wave component of the radio wave S1, and a characteristic line B indicated by the dashed line represents a reflection characteristic of a vertically polarized wave component of the radio wave S1. Furthermore, a graph of FIG. 3B illustrates reflection characteristics of the radio wave S2 that reflects from the depression 5b, a characteristic line C indicated by the solid line represents a reflection characteristic of a horizontally polarized wave component of the radio wave S2, and a characteristic line D indicated by the dashed line represents a reflection characteristic of a vertically polarized wave component of the radio wave S2. Here, the horizontal axis in each graph represents incident angle θ [deg], and the vertical axis represents reflectance R [–]. Furthermore, assume that permittivity εr of the object 5 is 3 (εr=3).

As indicated by the characteristic lines A and B in the graph of FIG. 3A, with respect to the radio wave S1 that reflects from the projection 5a, no difference due to polarization can be seen between the horizontally polarized wave component and the vertically polarized wave component in the vicinity of an incident angle θ of 0° ($R_{\theta=0}$) surrounded by the dashed line. On the other hand, as indicated by the characteristic lines C and D in the graph of FIG. 3B, with respect to the radio wave S2 that reflects from the depression 5b, a difference due to polarization can be seen between the horizontally polarized wave component and the vertically polarized wave component at each incident angle θ. In particular, in the vicinity of θ=15° to 75°, the reflectance R of the vertically polarized wave component is low, and a large difference can be seen between the reflectance R of the vertically polarized wave component and the reflectance R of the horizontally polarized wave component. In other words, there are few or no differences due to polarization in reflection intensity of the radio wave S1 at the projection 5a of the object 5 between the horizontally polarized wave component and the vertically polarized wave component, and there is a large difference due to polarization in reflection intensity of the radio wave S2 at the depression 5b between the horizontally polarized wave component and the vertically polarized wave component. Furthermore, in the case of a target having a length along a certain direction, such as a long thin cylinder, the reflection intensity of a polarized wave along the length is high.

Thus, pairing can be performed by determining, for each of the radar devices 2A and 2B, ratios between intensities of horizontally polarized wave components and vertically polarized wave components of reflected waves having peaks detected by each of the radar devices 2A and 2B, and combining, of relative distances to the plurality of targets T1, T2, T3, T4, . . . , and Tm calculated by the radar devices 2A and 2B, relative distances for which values of determined ratios are equal or close to each other.

In the object position detection system 1 according to the present embodiment, pairing is performed by using the above-described former method based on reception power Pr of each of reception waves and relative distances R to the targets T1, T2, T3, T4, . . . , and Tm, and pairing is also performed by using the above-described latter method based on horizontally polarized wave components and vertically polarized wave components of the reception waves.

The position calculation means in the arithmetic device 4 calculates a position of each of the targets T1, T2, T3, T4, . . . , and Tm in accordance with relative distances paired by the pairing means. For example, with respect to the targets T1 and T2, the position calculation means calculates their respective positions as follows.

Figure 4:
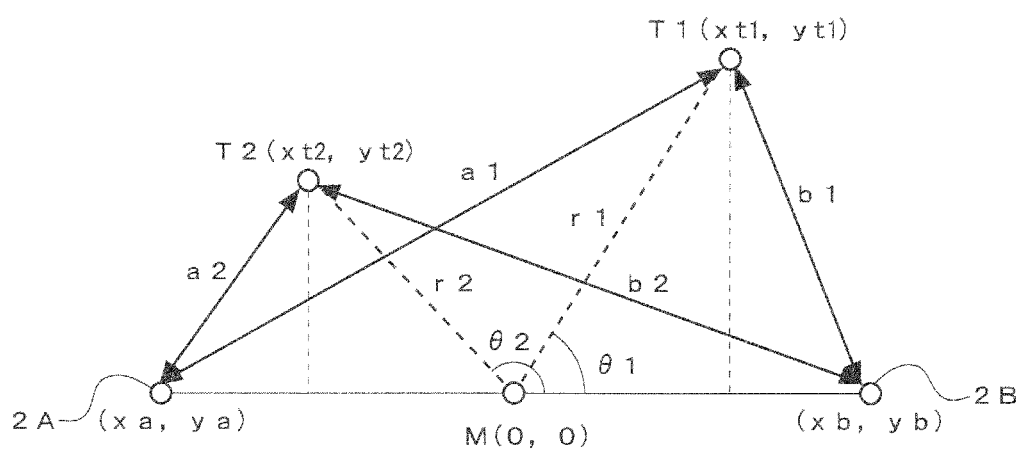
FIG. 4 illustrates position arithmetic for a detection target object performed by an arithmetic device constituting the object position detection system according to the one embodiment.

As illustrated in FIG. 4, assume that the pairing means pairs, for the target T1, a distance a1 calculated by the radar device 2A and a distance b1 calculated by the radar device 2B and pairs, for the target T2, a distance a2 calculated by the radar device 2A and a distance b2 calculated by the radar device 2B. Furthermore, assume that orthogonal coordinates of the radar device 2A are (xa, ya), that orthogonal coordinates of the radar device 2B are (xb, yb), and that an intermediate position between the radar devices 2A and 2B is at orthogonal coordinates (0, 0) of an origin point M. These orthogonal coordinates (xa, ya), (xb, yb), and (0, 0) are known coordinates. Furthermore, assume that unknown orthogonal coordinates and polar coordinates of the target T1 are respectively (xt1, yt1) and (r1, θ1) and that unknown orthogonal coordinates and polar coordinates of the target T2 are respectively (xt2, yt2) and (r2, θ2). In this case, values of the unknown orthogonal coordinates (xt1, yt1) of the target T1 can be geometrically calculated by the following expressions (3) and (4).

$$xt1 = (a1^2 - b1^2 - xa^2 + xb^2)/2(xb - xa) \quad (3)$$

$$yt1 = \{a1^2 - (xa - xt1)^2\}^{1/2} \quad (4)$$

Furthermore, values of the unknown orthogonal coordinates (xt2, yt2) of the target T2 can be geometrically calculated by the following expressions (5) and (6).

$$xt2 = (a2^2 - b2^2 - xa^2 + xb^2)/2(xb - xa) \quad (5)$$

$$yt2 = \{a2^2 - (xa - xt1)^2\}^{1/2} \quad (6)$$

The polar coordinates (r1, θ1) and (r2, θ2) of the targets T1 and T2 can be calculated from the orthogonal coordinates (xt1, yt1) and (xt2, yt2) of the targets T1 and T2. Furthermore, for the other targets T3, T4, . . . , and Tm as well, position coordinates can be similarly calculated.

Thus, in the object position detection system 1 according to the present embodiment, the radar devices 2A and 2B calculate relative distances between the radar devices 2A and 2B and the plurality of targets T1, T2, T3, T4, . . . , and Tm only by using pieces of frequency information of beat frequencies without using pieces of phase information of transmission waves and reception waves. Subsequently, the arithmetic device 4 calculates a position of each of the targets T1, T2, T3, T4, . . . , and Tm only by using relative distances from the individual radar devices 2A and 2B to each of the targets T1, T2, T3, T4, . . . , and Tm. For this reason, even when the radome 3 is provided in front of the transmission antenna 25 and the reception antenna 31, relative positions of the plurality of targets T1, T2, T3, T4, . . . , and Tm, that is, relative distances and relative angles are determined with accuracy without being affected by phase errors in transmission waves and reception waves. Furthermore, even if the targets T1, T2, T3, T4, . . . , and Tm are at a low elevation angle with respect to the radar devices 2A and 2B, errors in relative distances calculated and estimated by the radar devices 2A and 2B do not depend on relative angles of the targets T1, T2, T3, T4, . . . , and Tm with respect to the radar devices 2A and 2B and thus can be detected with accuracy.

Furthermore, the arithmetic device 4 determines relative angles of the targets T1, T2, T3, T4, . . . , and Tm without using phase difference information between the reception antennas 31. For this reason, the maximum number of angular separations of the targets T1, T2, T3, T4, . . . , and Tm that can be provided, that is, the maximum detectable number is not one less than the number of the reception antennas 31 and is not limited by the number of antennas.

Furthermore, the number of the radar devices 2A and 2B is not limited to two, and three or more radar devices 2A, 2B, . . . can be used. Not only when two radar devices 2A and 2B are used but also when three or more radar devices 2A, 2B, . . . are used, a plurality of transmission waves enter the targets T1, T2, T3, T4, . . . , and Tm from a plurality of radar devices 2A, 2B, . . . , and incident angles of those transmission waves differ according to the radar devices 2A, 2B, . . . . Thus, intensities of reception waves reflected from the targets T1, T2, T3, T4, . . . , and Tm and received also differ according to the radar devices 2A, 2B, . . . . For this reason, when relative distances to the targets T1, T2, T3, T4, . . . , and Tm calculated in any of the radar devices 2A, 2B, . . . that receives a reception wave of high signal intensity are referred to, in the radar devices 2A, 2B, . . . as well that receive a reception wave of low signal intensity, a faint reception wave can be found at a frequency corresponding to a calculated relative distance. Thus, the detection probability of the targets T1, T2, T3, T4, . . . , and Tm in each of the radar devices 2A, 2B, . . . is increased. Furthermore, in the case where three radar devices 2A, 2B, and 2C are used, when the radar device 2C is installed, for example, in an elevation angle direction, the present technique can be applied three-dimensionally.

Furthermore, the pairing means in the arithmetic device 4 performs, by using a plurality of different methods, pairing in which combinations of relative distances for the same target T1, the same target T2, the same target T3, the same target T4, . . . , and the same target Tm are specified, and thus pairing accuracy increases. As a result, in the overall object position detection system 1, the accuracy of detecting the targets T1, T2, T3, T4, . . . , and Tm increases.

Incidentally, although, in the above-described embodiment, the case has been described where the radome 3 is provided in front of the transmission antenna 25 and the reception antenna 31, the radome 3 does not necessarily have to be provided.

The case has been described where, in the object position detection system 1 according to the above-described embodiment, the radar devices 2A, 2B, . . . are FMCW radars, transmit respective continuous waves that have been subjected to frequency modulation to have different frequencies so that mutual interference does not occur, and calculate relative distances to the targets T1, T2, T3, T4, . . . , and Tm from beat frequencies between transmission waves and reception waves. However, the radar devices 2A, 2B, . . . are not limited to the FMCW radars, and any other radar devices may be employed that calculate relative distances without using pieces of phase information of transmission waves and reception waves. For example, the radar devices 2A, 2B, . . . can be pulse radars. The pulse radars emit respective pulse transmission waves toward the targets T1, T2, T3, T4, . . . , and Tm in a time-sharing manner so that mutual interference does not occur, and calculate relative distances to the targets T1, T2, T3, T4, . . . , and Tm from time periods that elapse before the pulse radars receive reception waves obtained by the pulse transmission waves being reflected back from the targets T1, T2, T3, T4, . . . , and Tm. In the case as well in which the object position detection system 1 is constituted by such pulse radars that calculate relative distances to the plurality of targets T1, T2, T3, T4, . . . , and Tm in accordance with pieces of time period information of transmission waves and reception waves, function effects similar to those in the above-described embodiment are achieved.

- 1 object position detection system
- 2A, 2B radar device
- 3 radome
- 4 arithmetic device
- 5 object
- 5*a* projection
- 5*b* depression
- 20 transmission unit
- 21 voltage control unit
- 22 VCO (voltage-controlled oscillator)
- 23 splitter
- 24, 32 polarized wave switching unit
- 25 horizontally and vertically polarized waves transmission antenna
- 30 reception unit
- 31 horizontally and vertically polarized waves reception antenna
- 33 mixer
- 34 A/D converter
- 35 FFT calculation unit and calculation result storage memory
- 36 peak detection and distance calculation unit
- T1, T2, T3, T4, . . . , and Tm target (detection target object)

The invention claimed is:

1. An object position detection system comprising:
   a plurality of radar devices configured to:
   receive, with respective reception antennas, reception waves, the reception waves being reflections of transmission waves from a plurality of detection target objects, the transmission waves being transmitted from respective transmission antennas, and
   calculate relative distances to the plurality of detection target objects without phase information of the transmission waves and the reception waves; and
   at least one processor configured to, via a plurality of different methods:
   combine, for the calculated relative distances, relative distances for a same detection target object, and
   calculate a position of each detection target object in accordance with the combined relative distances.

2. The object position detection system according to claim 1, wherein the plurality of different methods comprises:
   a first pairing method in which the relative distances are combined in accordance with reception power of each of the reception waves and the relative distances to the detection target objects, and
   a second a pairing method in which the relative distances are combined in accordance with horizontally polarized wave components and vertically polarized wave components of the reception waves.

3. The object position detection system according to claim 2, wherein each of the radar devices is:
   an FMCW radar device configured to calculate each of the relative distances to the plurality of detection target objects in accordance with frequency information of corresponding transmission and reception waves, or
   a pulse radar device configured to calculate each of the relative distances to the plurality of detection target objects in accordance with time period information of corresponding transmission reception waves.

4. The object position detection system according to claim 2, wherein the radar devices each comprise a radome in front of the respective transmission antennas and the respective reception antennas.

5. The object position detection system according to claim 1, wherein each of the radar devices is:
   an FMCW radar device configured to calculate each of the relative distances to the plurality of detection target objects in accordance with frequency information of corresponding transmission and reception waves, or
   a pulse radar device configured to calculate each of the relative distances to the plurality of detection target objects in accordance with time period information of corresponding transmission reception waves.

6. The object position detection system according to claim 5, wherein the radar devices each comprise a radome in front of the respective transmission antennas and the respective reception antennas.

7. The object position detection system according to claim 1, wherein the radar devices each comprise a radome in front of the respective transmission antennas and the respective reception antennas.

* * * * *